Patented Nov. 12, 1929

1,735,668

UNITED STATES PATENT OFFICE

FRANK H. BENGE, OF NORRISTOWN, AND ROBERT R. TITUS, OF VILLANOVA, PENNSYLVANIA, ASSIGNORS, BY MESNE ASSIGNMENTS, TO CONTINENTAL-DIAMOND FIBRE COMPANY, OF NEWARK, DELAWARE, A CORPORATION OF DELAWARE

METHOD OF MOLDING SYNTHETIC RESINS

No Drawing.　　　Application filed August 2, 1928. Serial No. 297,097.

Our invention relates to a process for the molding of synthetic resins and more particularly to those synthetic resins which are at the present time converted from the initial or soluble-fusible stage to the final or insoluble-infusible stage by heat and pressure.

One object of our invention is to provide a novel method of molding synthetic resins whereby it is possible to shorten the time required for the pressing operation and therefore to increase the production of a given unit.

Another object of our invention is to provide a cold pressing process which results in a great saving in the wear of the hydraulic presses since by following the process of this invention, it is not necessary alternately to heat and cool the press, with the resulting corrosion and wear of the metal, packing, valves and other mechanisms.

A further object is to provide a simple and expedient method of molding synthetic resins by which the molding costs are considerably reduced without impairing the quality of the finshed product. Other objects will be apparent from a consideration of the specification and claims.

This invention is applicable to various types of synthetic resins which are now treated in the molds under heat and pressure. It is particularly applicable to those resins known to the art as phenolic condensation products. These are typical of the resins which exist in two stages, the first stage known as the initial stage in which the resin is fusible and soluble and the second stage known as the final stage in which the resin is insoluble and infusible. The change from the initial stage to the final stage is at the present time accomplished by simultaneously subjecting the resin to heat and pressure. Our invention is not only applicable to phenolic condensation products but also to such other synthetic resins as are treated by heat and pressure such as those having urea or phthalic anhydride as one initial constituent. This simultaneous subjection of the resin to heat and pressure takes a considerable length of time, since it is necessary to heat the initial mass and then to bring about the chemical reaction. This time factor determines the production of the presses and hence a given unit is limited in the amount of material treated. Furthermore, the heat required in the presses causes wear and corrosion and the alternate cooling and heating of the presses is not only expensive but causes great wear on the metal parts, the packing, valves and other mechanical elements of the presses.

Our invention is characterized by a cold pressing operation, that is to say by following the present invention, it is not necessary to subject the resin to heat and pressure simultaneously but the heat is first applied and when the mass is sufficiently heated and while still in a heated condition, it is placed in a cold mold and formed to the desired shape under pressure.

At the present time, synthetic resins are generally used in conjunction with fillers which may be either in fibrous or granular condition or in the form of sheet material such as paper sheets or cloth. When granular or fibrous materials are used, the resin in a finely divided condition is usually mixed with the filler and the mixture then placed in a hydraulic press and subjected to heat and pressure. In the manufacture of products involving sheet material, it is customary to impregnate the sheet by means of a solution of the synthetic resin in an organic solvent, such as alcohol. The solvent is later evaporated and the treated sheets are cut to the desired size and superimposed one above the other until the desired thickness is obtained. The stack of superimposed sheets are then placed in a platen hydraulic press and molded under heat and pressure.

The process of the present invention may be satisfactorily employed both when molding the synthetic resin alone and when molding the resin in conjunction with a filler. In using filling materials, the processing prior to the molding step, that is to say the bringing together of the filler and the synthetic resin, is accomplished in accordance with any of the well known practices of the art.

The material to be molded is heated by any desired means to a temperature and for a time sufficient to insure conversion to the final stage after treatment in the hydraulic press. Both the temperature and time may vary widely but they are somewhat dependent on each other. For example, the use of a high temperature allows heating for a shorter time and vice versa. The mass, however, must not be heated beyond the stage where it is plastic. A temperature approximately that now employed in the hydraulic press to cause the conversion to the hard, infusible, insoluble stage gives good results. The hot plastic mass is placed in a cold hydraulic press and while still hot sufficient pressure exerted to cause the mass to take the desired shape.

In a specific case, a mass of phenol-formaldehyde resin, with or without a filler, is heated to a temperature of 300° F. for 20 minutes. While approximately at 300° F., it is placed in a cold mold in a hydraulic press and a pressure of 2200 lbs. per square inch is applied for 5 minutes. Following the old molding process, the time in the hydraulic press was approximately 45 minutes. Thus it will be seen that the production of a given unit is very materially increased. The product obtained by following the present invention is of similar quality as that now obtained by the simultaneous heat and pressure treatment.

Considerable modification is possible in the temperature employed and in the time of heating as well as in the degree of pressure and the time of pressing.

We claim:

1. The method of molding synthetic resins which comprises heating the initial condensation product of a synthetic resin at a temperature and for a time which will cause the resin to be converted into the final stage after the pressing operation, placing the hot plastic mass in a cold press and while the mass is still hot exerting sufficient pressure to obtain the molded form desired.

2. The method of molding phenolic condensation products which comprises heating the initial condensation product of a phenolic condensation product at a temperature and for a time which will cause the resin to be converted into the final stage after the pressing operation, placing the hot plastic mass in a cold press and while the mass is still hot exerting sufficient pressure to obtain the molded form desired.

3. The method of molding phenolic condensation products which comprises heating the initial condensation product at approximately 300° F. for approximately 20 minutes and thereafter while the mass is still hot and plastic placing it in a cold press under sufficient pressure to obtain the molded form desired.

4. The method of molding phenol-formaldehyde products which comprises heating the initial condensation product at approximately 300° F. for approximately 20 minutes and thereafter while the mass is still hot and plastic placing it in a cold press under sufficient pressure to obtain the molded form desired.

FRANK H. BENGE.
ROBERT R. TITUS.